3,535,102
SYNERGISTIC COMBINATION OF HERBICIDES—N,N-DISUBSTITUTED - α,α - DIPHENYLACETAMIDE (DIPHENAMID) AND A 2-(4-CHLORO-2-METHYLPHENOXY) PROPIONANILIDE
Everett E. Chambers and Arnolds Steinhards, Kalamazoo, Mich., assignors to The Upjohn Company, Kalamazoo, Mich., a corporation of Delaware
No Drawing. Filed June 10, 1968, Ser. No. 735,583
Int. Cl. A01n 9/02, 9/14, 9/20
U.S. Cl. 71—118                    16 Claims

ABSTRACT OF THE DISCLOSURE

Enhanced herbicidal activity occurs when an N,N-disubstituted-α,α-diphenylacetamide herbicide is applied with a 2-(4-chloro-2-methylphenoxy)propionanilide herbicide. A mixture comprising 1 part N,N-dimethyl-α,α-diphenylacetamide and 1 part 2-(4-chloro-2-methylphenoxy)propionanilide applied at the rate of 1.5 lbs. of the active ingredients per acre was especially effective. Other proportions, and various similar coacting herbicides are described along with details about compositions and some susceptible weeds.

SUMMARY OF THE INVENTION

This invention pertains to a novel composition of matter and a novel process. The invention is more particularly directed to a herbicidal composition comprising, as the essential active ingredients, an N,N-disubstituted-α,α-diphenylacetamide herbicide and a 2-(4-chloro-2-methylphenoxy)propionanilide herbicide; and the new process for controlling weeds with the new composition.

DETAILED DESCRIPTION

The active ingredient N,N-disubstituted-α,α-diphenylacetamide herbicide is known (e.g., diphenamid). And the method of controlling weeds with N,N-disubstituted-α,α-diphenylacetamide is described in U.S. Pat. No. 3,120,434 issued Feb. 4, 1964, to inventor Albert Pohland, and U.S. Pat. No. 3,043,676 issued July 10, 1962, to inventor Alan J. Lemin. This herbicide is particularly effective against grassy weeds. It is classified as a preemergence herbicide because it seems to prevent normal germination of weed seeds and growth of seedling weeds. The structural formula for purposes of this invention is:

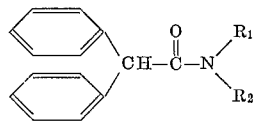

wherein $R_1$ and $R_2$ are selected from the class consisting of alkyl of from 1 to 3 carbon atoms, inclusive, i.e., methyl, ethyl, propyl, and isopropyl; and alkenyl of from 3 to 4 carbon atoms, inclusive, i.e., allyl, methallyl, 3-butenyl, and crotyl. The formula thus includes both N,N-dialkyl- and N,N-dialkenyl-α,α-diphenylacetamides.

The active ingredient 2-(4-chloro - 2-methylphenoxy)propionanilide is a new herbicide related to the known herbicide MCPP [2-(4-chloro-2-methylphenoxy)propionic acid]. This new herbicide is effective against both broad-leaved and grassy weeds and also acts against weed seeds and seedling weeds. The structural formula for purposes of this invention is as follows:

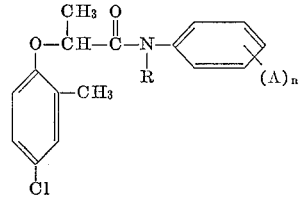

wherein A is halogen, lower-alkyl of from 1 to 4 carbon atoms, inclusive, nitro, lower-alkylsulfonyl or trifluoromethyl; n is an integer from 0 to 3, inclusive; and R is hydrogen, alkyl of from 1 to 8 carbon atoms, inclusive; alkenyl of from 3 to 8 carbon atoms, inclusive; cycloalkyl of from 3 to 8 carbon atoms, inclusive; cycloalkenyl of from 4 to 8 carbon atoms, inclusive; phenyl, substituted phenyl, and phenylalkyl.

The N-substituent R in Formula II is more explicitly described as including methyl, ethyl, propyl, butyl, pentyl, hexyl, heptyl, octyl, and isomeric forms thereof; allyl, 1-methallyl, 2-methallyl, 2-butenyl (crotyl), 3-butenyl, 1,2-dimethallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl - 2-butenyl, 1-ethyl - 2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl and the like; cyclopropyl, 2-methylcyclopropyl, 2,2-dimethylcyclopropyl, 2,3-diethylcyclopropyl, 2-butyl-cyclopropyl, cyclobutyl, 2-methylcyclobutyl, 3-propylcyclobutyl, 2,3,4-trimethylcyclobutyl, cyclopentyl, 2,2-dimethylcyclopentyl, cyclohexyl, 3-methylcyclohexyl, 2,2-dimethylcyclohexyl, cycloheptyl, cyclooctyl and the like; 2-cyclobutenyl, 3-cyclopentenyl, 3-cyclohexenyl, 2-ethyl-3-cyclohexenyl and the like; alkylphenyl, for example, o-tolyl, m-tolyl, p-tolyl, 3,5-xylyl, 5-tert-butylphenyl and the like; halophenyl, for example, 2-chlorophenyl, 4-bromophenyl, 3-iodophenyl, 2,6-dibromophenyl, 2-chloro-4-iodophenyl and the like; o-, m-, and p-trifluoromethylphenyl; lower alkylsulfonylphenyl, for example, 4-methylsulfonylphenyl, 3-ethylsulfonylphenyl, 2-methylsulfonylphenyl and the like; nitrophenyl, for example, o-nitrophenyl, m-nitrophenyl, p-nitrophenyl, 3,5-dinitrophenyl and the like; and phenylalkyl, for example, benzyl, phenethyl, 1-phenylethyl, 2-phenylpropyl, 3-phenylbutyl and the like.

It has now been found, in accordance with this invention, that N,N-disubstituted-α,α-diphenylacetamide and 2-(4-chloro-2-methylphenoxy)propionanilide are mutually hyperactivated when applied together for weed control. As co-herbicides the compounds appear to potentiate the herbicidal action of each other, and the result is more effective weed control than if either herbicide had been used alone.

The newly discovered mutual hyperactivation between N,N-disubstituted-α,α-diphenylacetamide and 2-(4 - chloro-2-methylphenoxy)propionanilide has been observed with several different compositions wherein the proportions of the herbicides were varied. One composition had 1.5 lbs. of a 50% wettable powder (50W) of 2-(4-chloro-2-methylphenoxy)propionanilide itself (MCPP anilide) and 3.0 lbs. of a 50% wettable powder (50W) of N,N-dimethyl-α,α-diphenylacetamide (diphenamide). Another composition had 1.5 lbs. of the 50W MCPP anilide and 1.5 lbs. of the 50W diphenamid. Still another composition had 3.0 lbs. of the 50W MCPP anilide and 1.5 lbs. of the 50W diphenamid. The foregoing compositions were each compared for herbicidal efficacy with the 50W diphenamid alone and the 50W MCPP anilide alone. The results of the tests against several weed species were as follows (where the rating scale was 0 to 10, 10 being complete kill):

ethylenesorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H–77), blends of

TABLE I

| Compositions and rate in lbs. per acre | Crab-grass | Yellow foxtail | Wild oats | Bindweed | Wild mustard | Morning glory | Johnson grass | Total herbicidal value for all weeds | Average rating |
|---|---|---|---|---|---|---|---|---|---|
| 0.75 lb. MCPP anilide / 1.5 lbs. diphenamid | 10 | 10 | 10 | 10 | 10 | 10 | 10 | 70 | 10 |
| 0.75 lb. MCPP anilide / 0.75 lb. diphenamid | 9 | 9 | 8 | 10 | 10 | 10 | 8 | 64 | 9.13 |
| 1.5 lbs. MCPP anilide / 0.75 lb. diphenamid | 9 | 9 | 8.5 | 10 | 10 | 10 | 8 | 64.5 | 9.21 |
| 1.5 lbs. MCPP anilide | 7 | 6 | 6 | 10 | 10 | 10 | 5.5 | 54.5 | 7.78 |
| 1.5 lbs. diphenamid | 10 | 7.5 | 5.5 | 2 | 2 | 2 | 5 | 34.8 | 4.85 |

These data show that each composition (1:2, 1:1, and 2:1) gave excellent control of the test weeds. Particular attention is directed to the 1:1 composition wherein only 0.75 lb. MCPP anilide and 0.75 lb. diphenamid (1.5 lbs. total herbicide) gave excellent control (rating 9.13) of the seven weed species.

Accordingly, this invention contemplates different proportions of the active ingredient herbicides, providing however that there is an appreciable amount of each herbicide. The lower limits of proportions for mutual hyperactivation are not definable. But in general, the proportion of N,N-disubstituted-$\alpha,\alpha$-diphenylacetamide (compound of Formula I) can vary from about 10% to about 90% and correspondingly, the proportion of 2-(4-chloro-2-methylphenoxy)propionanilide (compound of Formula II) can vary from about 90% to about 10%. Other proportions can be used providing enough of the composition is applied for control of weeds that the mutual hyperactivation is obtained. In practice, preferable proportions are from about one-third of one active ingredient to about two-thirds of the other active ingredient. However, as noted from Table I a 1:1 composition is particularly effective and especially preferred.

The herbicidal compositions according to the invention are usually prepared in homogeneous and readily dispersible forms, illustratively, the compositions are in the forms of true solutions; dispersions of a solid in a liquid, e.g., suspensions; dispersions of liquid in liquid, e.g., emulsions; dispersible powders, emulsifiable concentrate, granular formulations, and dusts. The true solutions are made with water-miscible or water-immiscible solvents. A solution comprising a water-immiscible solvent and a high concentration of the active ingredients is known as an emulsifiable concentrate. Usually, an emulsifiable concentrate will have wetting and dispersing agents incorporated for preparing emulsions with water and adapted for spraying. But, such agents can be kept separated from the solution of the active ingredients and added if desired to the mixture as it is prepared for spraying.

A preferred herbicidal composition according to the invention is a mixture known as a wettable powder. The active ingredients are in a comminuted or finely divided form so that the particles will be readily dispersible in water, and they are mixed with a finely divided diluent carrier. Wettable powders will usually include adjuvants such as wetting and dispersing agents that contribute to the technical qualities of the aqueous spray and further promote complete spray coverage.

Wettable powders are formulated with various concentrations of the active ingredients, conveniently up to about 90% by weight active ingredients. A preferred range of concentrations is from about 10% to about 60% by weight.

Surfactants useful for preparing wettable powders include alkyl sulfates and sulfonates, alkyl aryl sulfonates, sulfosuccinate esters, polyoxyethylene sulfates, polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The wettable powder compositions can be formulated with a mixture of surfactants of the types indicated if desired.

A suitable wettable powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredients. The resulting formulation has the following percentage composition (parts herein are by weight unless otherwise specified):

| | Percent |
|---|---|
| Active ingredients | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredients which can be applied to soil, undesired vegetation, or turf at the rate of 40 gals. per acre to give a total application of active ingredients of 1 lb. per acre.

Emulsifiable concentrates in accordance with the invention are prepared, for example, by dissolving the active ingredients (e.g., an N,N-disubstituted-$\alpha,\alpha$-diphenylacetamide and a 2-(4-chloro-2-methylphenoxy)propionanilide) and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol and the like can be included with the solvent carrier in order to enhance the solubility of the active ingredients. Aqueous emulsions are then prepared by mixing with water to give any desired concentration of atcive ingredients. The surfactants which can be employed in the aqueous emulsions of the invention are those types noted above. Mixtures of surfactants can be employed if desired.

Advantageously, the concentration of active ingredients in the emulsifiable concentrates can range from about 5% to about 50% by weight, preferably from about 10% to 40%. A concentrate comprising 20% by weight) of active ingredients dissolved in a water-immiscible solvent of the kind noted above can be admixed with an aqueous medium in the proportions of about 13 ml. of concentrate with 1 gal. of medium to give a mixture containing about 700 parts of active ingredients per million parts of liquid carrier. Similarly, 1 qt. of a 20% concentrate mixed with 40 gals. of water provides about 1200 p.p.m. of active ingredients. In the same manner, more or less concentrated solutions of active ingredients can be prepared.

The concentrate compositions of the invention which are intended for use in the form of aqueous dispersions or emulsions can also comprise a humectant, that is to say, an agent which will delay the drying of the composition in contact with the soil, undesired vegetation, or turfs to which it has been applied. Suitable humectants include glycerol, diethylene glycol, solubilized lignins, such as calcium lignosulfonate, and the like.

The rates of application to areas of soil, undesired vegetation, or turfs to be protected from noxious weeds will depend upon the species of plants to be controlled, the presence or absence of desirable species, the season of year at which treatment is undertaken, and the method and efficiency of applictaion. In general, selective herbicidal activity is obtained when the active ingredients are applied at the rate of about ⅛ to about 25 lbs. per acre, preferably at the rate of ½ to 8 lbs. per acre.

The compositions containing 2-(4-chloro-2-methylphenoxy)propionanilide and N,N - disubstituted-α,α-diphenylacetamide, according to the invention, can be applied to vegetation and interfused with soil by conventional methods. For example, an area of soil can be treated prior to or after seeding by spreading a granular formulation or aqueous spray, or a dust in accordance with the invention on the plant growth medium with or without mixing. For home lawn application, a conventional push-type spreader is satisfactory for a granular formulation. Dispersible powder suspensions, emulsions, or solutions can be sprayed from boom-type power sprayers or from hand-operated knapsack sprayers. Dusts can be applied by power dusters, or by hand-operated dusters. Dusts and granular formulations can also be applied at the time of seeding in bands spanning the seeded rows.

The term "soil" is employed in the present specification and claims in its broadest sense. Hence the term "soil" means a substance in which plants can take root and grow, and includes not only earth but compost, manure, muck, humus, sand, and the like. As used herein, the term does not exclude flooded cropfields such as rice paddies and cranberry bogs. And use of the herbicidal compositions for controlling aquatic weeds in ponds, lakes, marshes, swamps, swales, and potholes is contemplated.

The granular formulations of this invention are prepared with about 0.25% to about 80%, preferably 0.5% to 20% by weight, of active ingredients and a granular carrier, for example, vermiculite, pyrophyllite, and attapulgite. The active ingredients can be dissolved in a volatile solvent such as ethylene dichloride, methylene chloride, acetone, and the like, and sprayed on the granular carrier as it is mixed and tumbled. The granules are then dried. The granular carrier can range in particle size from about 10 to about 60 mesh, preferably about 30 to 60 mesh.

The herbicidal dust compositions of the invention are prepared by intimate admixture of from about 0.25% to about 80% by weight, preferably 0.5% to 20% of the active ingredients, with a solid pulverulent carrier which maintains the composition in a dry, free-flowing state. The herbicidal dusts of the invention can be prepared by admixing the active ingredients with a solid diluent and then milling. Preferably, however, the active ingredients are dissolved in a volatile organic solvent, of the kinds indicated above, and then sprayed on the solid carrier so as to assure thorough distribution. The mixture is then dried and milled to the desired size, e.g., less than about 60 microns.

Solid carriers that acn be used in the dust compositions of the inevntion include the natural clays such as China clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphite, precipitated calcium carbonate, precipitated calcium silicate, and colloidal silica. The solid diluents which can be employed in the compositions also include solid, compounded fertilizers. Such solid compositions can be applied to soil in the form of dusts by the use of conventional machinery.

The new herbicide 2-(4-chloro - 2 - methylphenoxy) propionanilide itself is prepared by reacting 2-(4-chloro-2-methylphenoxy)-propionic acid with aniline. This reaction is effected by heating the acid with the amine in the presence of a dispersions medium, preferably an inert organic solvent, illustratively, xylene. By heating the reactants mixed in xylene at the reflux temperature for about 18 hrs. and separating the water produced by the reaction, e.g., collecting the water in a Dean-Stark trap, there is produced the desired 2-(4-chloro-2-methylphenoxy)-propionanilide having a melting point of 141 to 142° C. The same procedure can be used for the other 2-(4-chloro - 2 - methylphenoxy)propionanilide according to Formula II if desired.

Another way of preparing the new 2-(4-chloro - 2-methylphenoxy)propionanilides is by reacting a 2-(4-chloro-2-methylphenoxy)propionyl halide, preferbaly the chloride, or a loweralkyl 2-(4-chloro-2-methylphenoxy) propionate with an aniline of the formula:

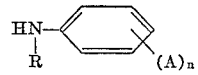

wherein (A), n, and R are as already defined.

Illustratively, 2-(4-chloro - 2 - methylphenoxy)propionyl chloride, prepared by reacting 2 - (4 - chloro-2-methylphenoxy)-propionic acid with a halogenating agent, e.g., thionyl chloride, is reacted with aniline in the presence of a dispersions medium, preferably an organic liquid, for example, ether, benzene, toluene, and like organic liquids. This reaction is spontaneous and a solution of the acid chloride is advisedly added slowly (dropwise) with stirring to a solution of the aniline. Since hydrogen chloride is formed by the reaction, an acid acceptor is desirable in the reaction mixture. A suitable acid acceptor is the aniline reactant itself if it is economically available. Otherwise, a base such as sodium hydroxide, potassium hydroxide, potassium carbonate, sodium bicarbonate, triethylamine, pyridine, and like bases can be used. The carbonate and bicarbonate bases provide a convenient sign of completion of the reaction, because release of carbon dioxide gas ceases. The temperature of the reaction mixture is not critical within the range about 0° C. to the boiling point, but the reaction is preferably effected between about 20° C. and the boiling point. The 2-(4-chloro-2-methylphenoxy)propionanilide is recovered by conventional procedures, e.g., filtration.

Further illustratively, methyl 2-(4-chloro-2-methylphenoxy)propionate, prepared by heating a solution of 2-(4-chloro - 2 - methylphenoxy)propionic acid with dimethyl sulfate in the presence of a base (potassium carbonate), is reacted with 3,4-dichloroaniline in a dispersions medium, preferably an organic liquid, for example, methanol containing an alkali metal hydroxide, e.g., potassium hydroxide. This reaction also proceeds spontaneously with generation of heat, and the reaction mixture is advisedly maintained at about 25° C., by cooling the mixture if necessary. The 2-(4-chloro-2-methylphenoxy)propion-3,4-dichloroanilide product is recovered by conventional procedures such as removing the reaction medium by distillation or filtration.

In accordance with the foregoing procedures, there is prepared a variety of 2-(4-chloro-2-methylphenoxy)propionanilides described by Formula II. Specific ones are:

2-(4-chloro-2-methylphenoxy)propion-4-chloroanilide;
2-(4-chloro-2-methylphenoxy)propion-4-methylsulfonylanilide;
2-(4-chloro-2-methylphenoxy)propion-4-trifluoromethylanilide;
2-(4-chloro-2-methylphenoxy)propion-3,5-dinitroanilide;
2-(4-chloro-2-methylphenoxy)propion-2,6-dinitroanilide;
2-(4-chloro-2-methylphenoxy)propion-2,6-dinitro-4-trifluoromethylanilide;
2-(4-chloro-2-methylphenoxy)propion-3,5-dinitro-4-trifluoromethylanilide;
2-(4-chloro-2-methylphenoxy)propion-3,5-dinitro-4-methylsulfonylanilide;
2-(4-chloro-2-methylphenoxy)-propion-2,3,4,5,6-pentachloroanilide;
2-(4-chloro-2-methylphenoxy)propion-o-toluidide;
2-(4-chloro-2-methylphenoxy)propion-3-ethylanilide;
2-(4-chloro-2-methylphenoxy)propion-4-isopropylanilide;
2-(4-chloro-2-methylphenoxy)propion-4-tert-butylanilide;
2-(4-chloro-2-methylphenoxy)propion-3,5-dinitro-4-tert-butylanilide;
2-(4-chloro-2-methylphenoxy)propion-3,4-dichloro-m-toluidide;
2-(4-chloro-2-methylphenoxy)propion-N-methylanilide;
2-(4-chloro-2-methylphenoxy)propion-N-phenylanilide;
2-(4-chloro-2-methylphenoxy)propion-N-phenethylanilide;
2-(4-chloro-2-methylphenoxy)propion-N-benzyl-3,4-dichloroanilide;
2-(4-chloro-2-methylphenoxy)propion-N-ethyl-3-trifluoromethylanilide;
2-(4-chloro-2-methylphenoxy)propion-N-allylanilide;
2-(4-chloro-2-methylphenoxy)propion-N-cyclohexylanilide;
2-(4-chloro-2-methylphenoxy)propion-N-(3-cyclohexenyl)anilide;
and 2-(4-chloro-2-methylphenoxy)propion-N-(4-chlorophenyl)anilide.

Each of the named 2-(4-chloro-2-methylphenoxy)propionanilides are active herbicides and when applied to soil with N,N-disubstituted-α,α-diphenylacetamide exhibit superior herbicidal action in the combination.

Representative unitary combinations of an N,N-disubstituted-α,α-diphenylacetamide and a 2-(4-chloro-2-methylphenoxy)propionanilide are:

50% N,N-diallyl-α,α-diphenylacetamide and
50% 2-(4-chloro-2-methylphenoxy)propionanilide itself;

50% N,N-dimethyl-α,α-diphenylacetamide and
50% 2-(4-chloro-2-methylphenoxy)propion-3,4-dichloroanilide;

66⅔% N,N-dimethyl-α,α-diphenylacetamide and
33⅓% 2-(4-chloro-2-methylphenoxy)propion-3-trifluoromethylanilide;

33⅓% N,N-dimethyl-α,α-diphenylacetamide and
66⅔% 2-(4-chloro-2-methylphenoxy)propion-4-methylsulfonylanilide;

25% N,N-dimethyl-α,α-diphenylacetamide and
75% 2-(4-chloro-2-methylphenoxy)propion-3,5-dinitro-4-trifluoromethylanilide;

90% N,N-diallyl-α,α-diphenylacetamide and
10% 2-(4-chloro-2-methylphenoxy)propion - 2 - chloroanilide;

25% N,N-diallyl-α,α-diphenylacetamide and
75% 2-(4-chloro-2-methylphenoxy)propion - N - methylanilide;

50% N,N-dimethyl-α,α-diphenylacetamide and
50% 2-(4-chloro-2-methylphenoxy)propion - N - phenylanilide;

and

66⅔% N,N-dimethyl-α,α-diphenylacetamide and
33⅓% 2-(4-chloro - 2 - methylphenoxy)propion-N - (4-nitrophenyl)-3,4-dichloroanilide.

What is claimed is:

1. The method of controlling weeds which comprises applying to a soil infested with weeds or weed seeds a herbicidally effective amount of a composition comprising N,N-disubstituted-α,α-diphenylacetamide of the formula:

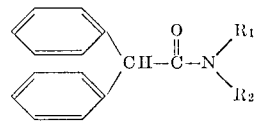

wherein $R_1$ and $R_2$ are selected from the class consisting of alkyl of from 1 to 3 carbon atoms, inclusive, and alkenyl of from 3 to 4 carbon atoms, inclusive, and 2-(4-chloro - 2 - methylphenoxy)propionanilide of the formula:

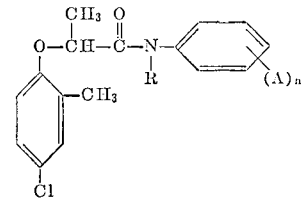

wherein A is halogen, alkyl of from 1 to 4 carbon atoms, inclusive, nitro, lower-alkylsulfonyl or trifluoromethyl; $n$ is an integer from 0 to 3, inclusive; and R is hydrogen, alkyl of from 1 to 8 carbon atoms, inclusive, alkenyl of from 3 to 8 carbon atoms, inclusive; cycloalkyl of from 3 to 8 carbon atoms, inclusive; cycloalkenyl of from 4 to 8 carbon atoms, inclusive; phenyl, substituted phenyl and phenylalkyl.

2. The method according to claim 1 wherein the N,N-disubstituted-α,α-diphenylacetamide is N,N-dialkyl and the 2-(4-chloro-2-methylphenoxy)propionanilide is $n=0$ and R=hydrogen.

3. The method according to claim 2 wherein the N,N-dialkyl-α,α-diphenylacetamide is N,N-dimethyl.

4. The method according to claim 3 wherein the composition comprises a unitary amount of active ingredient characterized in that from about 10% to about 90% is N,N-dimethyl - α,α - diphenylacetamide and correspondingly from about 90% to about 10% is 2-(4-chloro-2-methylphenoxy)propionanilide itself.

5. The method according to claim 4 wherein the composition comprises a unitary amount of active ingredient characterized by about 50% N,N-dimethyl-α,α-diphenylacetamide and about 50% 2-(4-chloro-2-methylphenoxy)propionanilide itself.

6. The method according to claim 5 wherein the composition is applied at the rate of about ½ lb. to about 8 lbs. per acre.

7. The method according to claim 6 wherein the composition is applied at the rate of about 1½ lbs. per acre.

8. The method according to claim 6 wherein the composition is applied at the rate of about 2 to about 3 lbs. per acre.

9. Homogeneous, dispersible composition comprising N,N-disubstituted-α,α-diphenylacetamide of the formula:

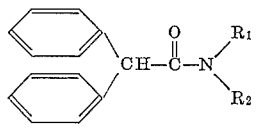

wherein $R_1$ and $R_2$ are selected from the class consisting of alkyl of from 1 to 3 carbon atoms, inclusive, and alkenyl of from 3 to 4 carbon atoms, inclusive, and 2-(4-chloro-2-methylphenoxy)propionanilide of the formula:

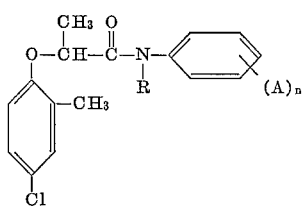

wherein A is halogen, alkyl of from 1 to 4 carbon atoms, inclusive, nitro, lower-alkylsulfonyl or trifluoromethyl; $n$ is an integer from 0 to 3, inclusive; and R is hydrogen, alkyl of from 1 to 8 carbon atoms, inclusive; alkenyl of from 3 to 8 carbon atoms, inclusive; cycloalkyl of from 3 to 8 carbon atoms, inclusive; cycloalkenyl of from 4 to 8 carbon atoms, inclusive; phenyl, substituted phenyl, and phenylalkyl, the herbicides being present in a herbicidally effective amount.

10. Composition according to claim 9 wherein the N,N-disubstituted-α,α-diphenylacetamide is N,N - dialkyl and the 2-(4 - chloro-2-methylphenoxy)propionanilide is $n$=0 and R=hydrogen.

11. Composition according to claim 10 wherein the N,N-dialkyl-α,α-diphenylacetamide is N,N-dimethyl.

12. Composition according to claim 11 comprising at least 10% of a carrier diluent and a unitary amount of active ingredient characterized in that from about 10% to about 90% is N,N-dimethyl-α,α-diphenylacetamide and correspondingly from about 90% to about 10% is 2-(4-chloro-2-methylphenoxy)propionanilide itself.

13. Composition according to claim 12 wherein the active ingredient is about 50% N,N-dimethyl-α,α-diphenylacetamide and about 50% 2-(4-chloro-2-methylphenoxy)-propionanilide itself.

14. Composition according to claim 13 wherein the unitary amount of active ingredient constitutes from about 50% to about 80% of the composition by weight and a surfactant is included.

15. Composition according to claim 12 wherein the active ingredient is about 66⅔% N,N-dimethyl-α,α-diphenylacetamide and about 33⅓% 2-(4-chloro-2-methylphenoxy)propionanilide itself.

16. The method according to claim 4 wherein the composition comprises a unitary amount of active ingredient characterized by about 66⅔% N,N-dimethyl-α,α-diphenylacetamide and about 33⅓% 2-(4-chloro-2-methylphenoxy)propionanilide itself.

References Cited

UNITED STATES PATENTS

| | | | |
|---|---|---|---|
| 2,577,969 | 12/1951 | Jones | 71—118 |
| 3,120,434 | 2/1964 | Pohland. | |
| 3,152,881 | 10/1964 | Lemin et al. | 71—118 |
| 3,152,883 | 10/1964 | Lemin et al. | 71—118 |
| 3,152,884 | 10/1964 | Lemin et al. | 71—118 |
| 3,360,356 | 12/1967 | Vartiak | 71—118 |
| 3,385,690 | 5/1968 | Lucken Baugh | 71—118 |

FOREIGN PATENTS 1,041,982   9/1966   Great Britain.

OTHER REFERENCES

Schubert et al., "Evaluation of Herbicide Treatments on Weed Control and Yield of Tomatoes," 1966.

Proc. N.E., Weed Control Conf., vol. 20, 1966, pp. 59–66.

LEWIS GOTTS, Primary Examiner

G. HOLLRAH, Assistant Examiner

U.S. Cl. X.R.

11—103